United States Patent [19]
Feilbach, Jr. et al.

[11] 3,938,962
[45] Feb. 17, 1976

[54] LAMINATED COMPOSITE WEAR MATERIALS

[75] Inventors: Weston H. Feilbach, Jr., Bethlehem, Pa.; Charles S. Baum, St. Clair Shores, Mich.

[73] Assignee: Weston H. Feilbach, Bethlehem, Pa.

[22] Filed: Apr. 4, 1974

[21] Appl. No.: 457,800

[52] U.S. Cl. .................................................. 29/191
[51] Int. Cl.² ........................................ B32B 15/00
[58] Field of Search ............ 29/195 A, 182.2, 182.3, 29/182.5, 191, 124, 132, 527.4, 433, 458, 467, 469; 148/31.55, 31.57, 34; 241/294, 295, 298; 161/196, 213; 51/309

[56] References Cited
UNITED STATES PATENTS

| | | | |
|---|---|---|---|
| 2,779,699 | 1/1957 | Langworthy | 148/31.55 X |
| 3,539,192 | 11/1970 | Prasse | 75/.5 R X |
| 3,606,359 | 9/1971 | McCormick | 75/.5 R X |
| 3,684,497 | 8/1972 | Wendler et al. | 75/200 X |

Primary Examiner—C. Lovell
Assistant Examiner—O. F. Crutchfield
Attorney, Agent, or Firm—Krass & Young

[57] ABSTRACT

Metallic parts having a hard wear-resistant surface and the high impact resistance associated with softer materials are formed by coating a plurality of ductile, relatively soft metallic segments with a relatively hard wear-resistant material, stacking the segments so that portions of each of their coated surfaces are exposed to form a composite coated surface, and mechanically locking the segments together to form a unitary member. The members formed by this technique exhibit the surface characteristics associated with the hardened coating such as improved wear, impact and abrasion resistance, and exhibit the bulk physical properties of the base material such as strength and ductility. Moreover, the surface treatment has a depth which would be unobtainable if the part were formed of a single section treated with the surface coating; the coating is not only formed on the exterior surface of the composite part, but extends toward the interior of the part for substantial depths.

9 Claims, 10 Drawing Figures

LAMINATED COMPOSITE WEAR MATERIALS

BACKGROUND OF THE INVENTION

1. Field of the Invention

This invention relates to composite metallic articles formed by treating the surfaces of a plurality of segments to alter their physical properties and joining the segments, alone or with other treated segments, into a single composite body.

2. Prior Art

A variety of surface treatments and coatings have been developed to provide parts formed of metal with surface properties which are metallurgically incompatible with the necessary bulk properties of the part, and/or too expensive to achieve throughout the part. For example, the cam shaft of a reciprocating engine must be relatively ductile so as to withstand the bending stresses imposed on it by the unbalanced weights of its lobes yet its cam surfaces must be very hard to withstand the friction forces imposed by their sliding contact with the valve lifters without excessive wear. Since no metal which might be practically used as a cam shaft combines the necessary ductility and wear resistance, cam shafts are typically formed by employing a ductile steel shaft and hardening the surface of the shaft at points contacted by the valve lifters with a carburization process. While improving surface hardness is the most common reason for the application of surface coatings and treatments, these techniques may be used for other purposes such as providing a relatively soft bearing surface on a hard steel shaft.

An inherent disadvantage of these coated or surface treated metal parts is their limited life resulting from inevitable wear of the surface coatings. The coatings are limited in thickness because of the nature of the metallurgical processes involved or because of the inherent physical limitations of the coating. For example, surface hardening by carburization is typically limited to a depth of about ⅛ inch. Coatings consisting of a grit of tungsten particles suspended in a softer metal matrix are difficult to apply in depths of more than about ½ inch in typical applications.

Many of these coating and surface treatment processes are also severely limited in the configuration of the surface to which they may be applied. For example, certain of the coating techniques can only be applied to a relatively flat surface while it is disposed in a horizontal attitude with unlimited clearance from above.

3. SUMMARY OF THE INVENTION

The present invention is directed to metallic articles which enjoy the advantages of coating or surface treatment techniques, yet overcome these and other disadvantages of such surface treatments in a unique manner. Broadly, the particles of the present invention are formed by joining together a plurality of metallic segments, at least certain of which have previously been operated on by a surface treating and/or coating process to modify the properties of at least a portion of the segment's surface. The segments are joined so at least certain portions of the composite part's surface share the surface treatment; but the surface treatment also extends to the interior of the composite workpiece. These subsurface treated areas are so configured that they may become part of the surface as a result of wear of the part beyond the maximum depth of the particular surface treatment used.

By the way of example, one of the preferred embodiments of the invention, which will be subsequently disclosed in detail and is only to be considered exemplary of the type of parts which may be formed in accordance with the present invention, constitutes a cage-type crushing mill bar.

These crushers are used to comminute relatively large brittle bodies such as metal ores or stones into smaller particle size. They employ a cage formed of a plurality of bars joining the perimeter of two separated end plates. The cages are rotated on an axis parallel to the bars so that relatively large pieces of the material to be crushed are impacted against one another and against the bars. In order to withstand this continual pounding the surfaces of the bars must be as hard as the material being crushed and the bars must be relatively ductile to prevent their cracking under the impact forces imposed by the particles. The bars are formed of a plurality of steel discs having central holes and coated on both sides with a layer of fine tungsten carbide grit embedded in a copper matrix. The discs are all supported on an elongated steel pin which passes through their central holes and are retained on the pin by nuts which engage the threaded ends of the pin.

The resulting bar has a surface characterized by alternate layers of the grit coating and the base material of the discs. These layers extend normally to the surface to the shaft all the way to the center pin. The coatings are extremely wear resistant and the interleaved steel layers provide the assembly with a much greater toughness than would be found in a solid tungsten carbide shaft of the same dimensions. The structure of this composite part is such as to take advantage of those properties of the materials which are required in the finished part and to reinforce the weaker properties of each material with complementary properties of the other material.

A wide variety of composite parts may be formed in accordance with the present invention. In addition to stacking a plurality of coated sections in direct abutment to one another various uncoated segments may be inter-leaved with the coated segments in certain embodiments of the invention. The method of joining the segments together to form a unitary part may differ in alternate embodiments of the invention. In addition to mounting the segments on a pin a clamp may be employed to cause the parts to exert compressive forces on one another. The surfaces of the workpieces that abut one another may alternatively have configurations that allow the segments to interlock into a unitary structure.

These and other objectives, advantages and applications of the present invention will be illustrated by the following detailed description of several preferred embodiments of the invention. The description makes reference to the accompanying drawings in which.

Figure 1:
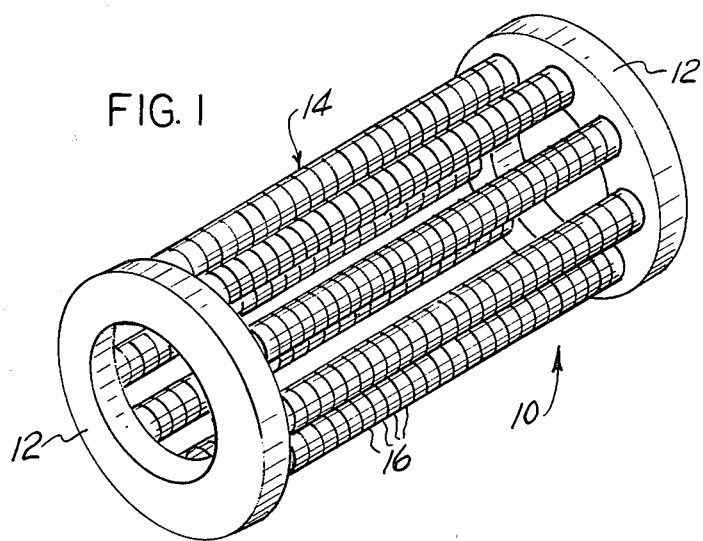
FIG. 1 is perspective view of the cage of a crusher mill, employing cage bars formed in accordance with the present invention.
Figure 2:
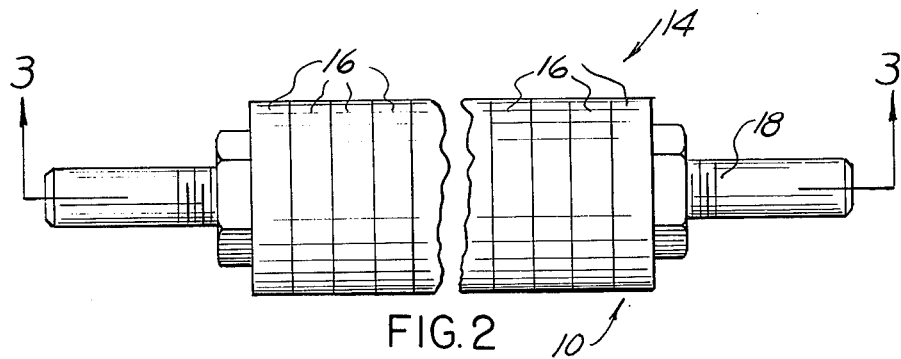
FIG. 2 is a perspective view of one of the cage bars of the crushing mill of FIG. 1.

Referring to the drawings, FIG. 1 illustrates a cage of a crushing mill employing bars formed in accordance with the present invention. The cage, generally illustrated at 10, consists of a pair of annular rings 12 formed of flat steel plate and supported a spaced distance from one another by a plurality of crusher bars 14 which extend between the rings 12 and have their ends fixed to the rings at regular distances about the perimeters of the rings. A typical cage may employ bars about ten inches in length and rings having a diameter of 36 inches. In a typical mill a cage of this size may be disposed within a larger diameter cage and both may be supported for rotation in opposed directions. The cages are supported within an appropriate retaining structure and the material to be crushed typically dropped into the cages from above. The spacing between the bars is somewhat larger than the mean size of the lumps of material introduced so that the lumps fall within the cage and they are ricocheted about by the rotation of the cages.

Mills of this sort are used for pulverizing ore, scrap material, and the like.

The bars 14 are continually impacted by the material being crushed and accordingly are subjected to heavy abrasive forces and bending moments. If the bars were made of a wear resistant material which typically has a low impact strength, the forces would crack the bars; inversely, if the bars were made of a material having sufficient toughness to withstand the impact forces the abrasion forces would weaken the bars to the point of breaking.

In accordance with the preferred embodiment the bars 14 are formed by joining together a plurality of annular discs 16. The discs are arrayed on an elongated cylindrical pin 18 which passes through their central holes. An elongated keyway 20 is formed through most of the length of the pin 18 and a key 22 passes through slots 24 formed in the central holes of the discs and secures the discs against rotation with respect to the pins. The discs 16 are retained against axial movement on the pins by a pair of nuts 26 which engage threads 28 formed on the opposite ends of the pin. The nuts force the discs into intimate engagement with one another.

Figure 3:
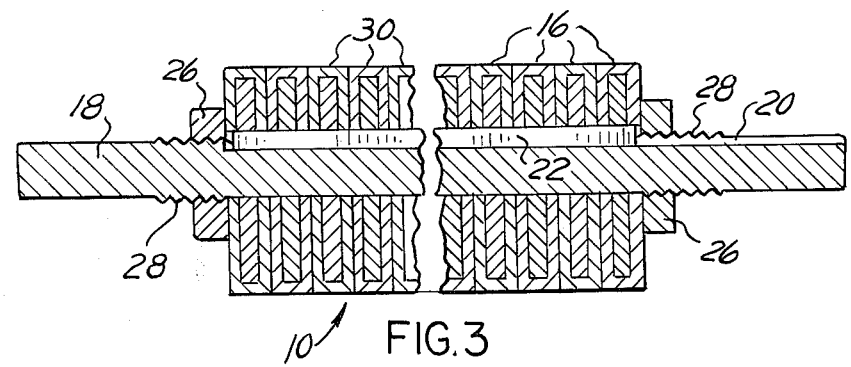
FIG. 3 is sectional view of the bar of FIG. 2 taken along line 3—3 of FIG. 2.
Figure 4:
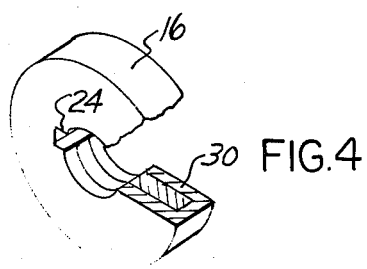
FIG. 4 is a perspective view, partially broken away, of the disc shaped segments which are used to form the bar of FIG. 2.

Each of the discs is formed of a mild steel such as SAE 1020 having a hardened surface formed by a carburizing treatment. This effectively creates a hardened, relatively brittle exterior coating indicated at 30 in FIGS. 3 and 4. This highly wear resistant coating thus extends over the exposed surfaces of the discs 16 and also extends, in layers, separated by the uncarburized core material of the discs, to the center holes of the discs. These coatings provide the necessary wear resistance for the bar while the uncarburized cores of the disc provide the structure with the resilience to take the impact imposed by the rolls.

The equivalent prior art structure might be considered to be a unitary bar formed of the mild steel and carburized on its exterior surface. However, this carburization would have a depth of approximately ⅛ inch and after that thin layer wore through the mild steel would be exposed to the impact of the material being crushed. By contrast, when the surface coatings on the edges of the discs 16 wear through, only thin layers of the uncarburized core, separated by the hardened layers are exposed. These hardened layers prevent gross erosion of the bar. If an extremely hard unitary bar were employed such as a sintered tungsten carbide shaft, not only would it be extremely expensive but it would be too brittle to assume the impact forces.

Figure 5:
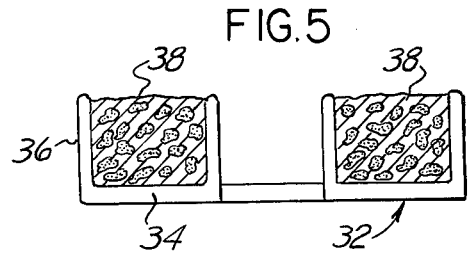
FIG. 5 is a sectional view through an alternative form of disc which could be substituted for the discs 16 of the embodiment of FIG. 1.

FIG. 5 illustrates an alternative form for the discs 16, generally indicated at 32. The discs are formed as toroidal pans 34 of sheet steel having a central toroidal cavity 36. The cavity is filled with a mixture of tungsten carbide grit 38 of relatively small particle size supported in a matrix of copper based alloy. U.S. Pat. No. 3,684,497 discloses a method of forming such coatings. They combine the wear resistance of carbide with the ductility of the softer matrix. These properties are ideal for the shaft but the material does not have sufficient resistance to the bending stresses imposed by impact loading for unsupported use. The pan 34 acts as a mold for the formation of the grit composite and also provides the unit with the required bending resistance.

Figure 6:
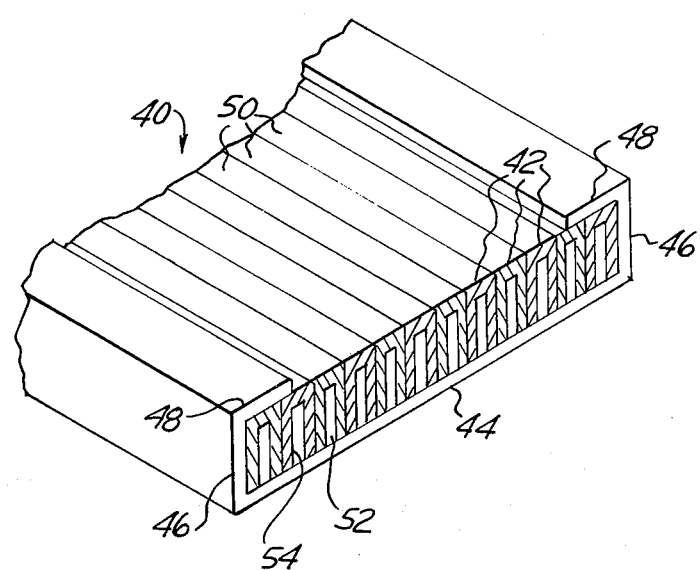
FIG. 6 is a perspective sectional view through a slide formed in accordance with the invention and representing an alternative embodiment.

FIG. 6 discloses an alternative form of the invention wherein a plurality of metallic segments having treated surfaces are joined into a composite unit by a clamp arrangement. The device of FIG. 6 constitutes a slide, generally indicated at 40, for conveying rough, hard, abrasive bodies such as heated ore. The slide is formed of a plurality of elongated rectangular rails 42 disposed side by side and retained within a steel pan 44. The pan supports one short end of each of the rails on its upper surface and has upwardly bent end sections 46 which engage the sides of the two extreme rails 42 and terminate in reversely bent flanges 48 which extend toward one another and engage the upper ends of the outermost rails. The pan thus acts as a clamp to retain the rails in pressured abutment to one another so that their top surfaces 50 form a continuous slide surface. The entire structure is inclined so that parts delivered to the top of the slide move along the surface 50 under the force of gravity.

Figure 7:
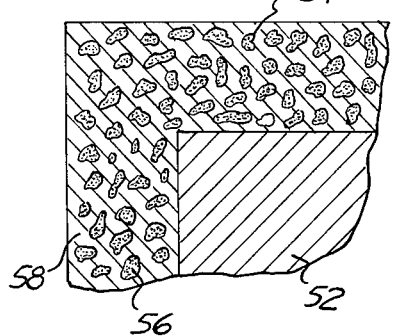
FIG. 7 is an enlarged sectional view through part of one of the bars employed in the slide of FIG. 6.

Each of the rails is formed by a rectangular steel core member 52 coated on three of its sides with structure 54 formed by irregular tungsten carbide particles supported in a softer metal matrix. The coating may be formed by the method disclosed in the aforementioned U.S. Pat. No. 3,684,497 or by alternative processes such as that disclosed in U.S. Pat. No. 3,023,490 or U.S. Pat. No. 3,049,435. FIG. 7 is an enlarged section through a corner of one of the rails 42 illustrating this structure in greater detail.

The coating 54 is seen to comprise a plurality of irregularly shaped particles 56 of tungsten carbide, silicon carbide, or the like, embedded in a matrix of a lower melting temperature alloy such as copper 58. Carbide particles 56 provide the rails with excellent abrasion resistance while the impact of heavy bodies dropped onto the slide. While the cost of the slide formed in accordance with this technique will substantially exceed the cost of a conventional high quality steel slide, the longer life of the slide formed in accordance with this invention will result in lower capital expenditures over the life of the slide.

Figure 8:
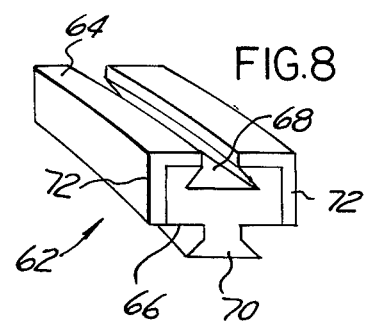
FIG. 8 is a side view of a blower blade formed in accordance with the invention and representing a third embodiment thereof.
Figure 9:
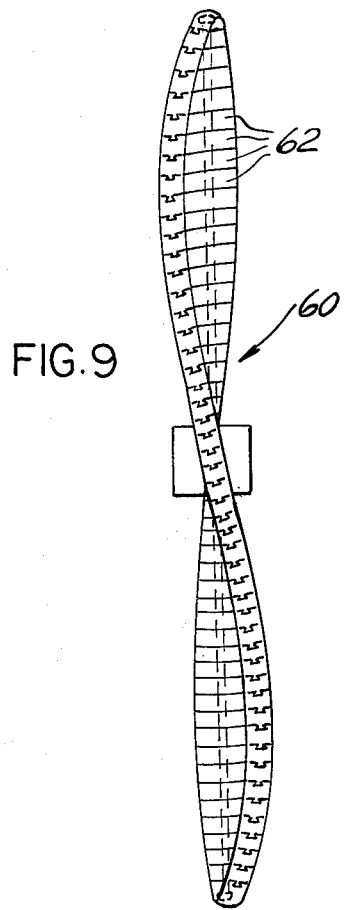
FIG. 9 is a perspective view of one of the segments which make up the blade of FIG. 8.
Figure 10:
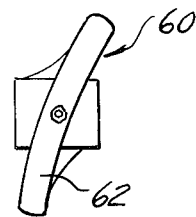
FIG. 10 is top view of the blade of FIG. 8.

A third embodiment of the invention wherein the surface coated segments which make up the composite part are retained with respect to one another through means of a mechanical interlock as illustrated in FIGS. 8, 9, and 10. The article, generally indicated at 60, is a fan blade for a ventilating system. It consists of an elongated rectangular shape twisted spirally about its elongated axis. It is composed of a plurality of segments 62, each of which consists of a rectangular section having parallel top and bottom surfaces 64 and 66 which extend normally to the central axis of the blade. The top surface 64 contains a groove 68 extending its length and the bottom surface 66 contains a tongue 70 which is complementary to the groove 68. The segments all have similar forms which differ from one another so that when stacked together they form the shaped blade. By stacking a plurality of sections 62 with the tongue of one arranged in the groove of the next the blade is formed. The central section of each segment, including the grooves 68 and the tongues 70, are formed of hardened steel. The sides of each segment are hardened with a coating 72 of carbide grit suspended in a softer metal matrix which may be formed by any of the processes disclosed in previously mentioned patent applications, or other known processes. It would be difficult, if not impossible, to form such a coating on a steel base having dimensions of the entire blade, but no difficulty is encountered in forming the coating on the smaller surfaces of the individual segments 62.

The blade may be used in ventilating systems or compressors through which hard particulate matter sometimes flows. It may be employed with jet engine compressors where it is impossible to filter the incoming air before it reaches the compressor. Blades formed in accordance with this technique have a high surface abrasion resistance ability and ductility of the central core section.

In other embodiments of the invention the segments could form one continuous length of material spirally wound into a closed configuration.

The embodiments of the invention in which an exclusive property or privilege is claimed are defined as follows:

1. A composite body consisting of a plurality of metallic sections stacked and retained relative to one another so that a portion of the surface of each section abuts a portion of the surface of an adjourning section and another portion of the surface of each section forms a portion of the surface of said composite body, characterized by the process of treating, prior to assembly of said sections into said body, at least certain of the sections at said portions of their surfaces which abut an adjourning section so as to harden the surface of said sections.

2. The composite body of claim 1 wherein said process of treating produces a coating of a dissimilar material on the portions of the surfaces so treated.

3. The composite body of claim 2 wherein the coating is harder than the metal body and the metal body has a greater ductility than the coating.

4. The composite body of claim 3 wherein the coating consists of hard particles supported in a softer metal matrix.

5. The composite body of claim 4 wherein the hard particles are carbide compounds.

6. The composite body of claim 1 wherein said treatment extends over the entire portions of the surfaces of each section which form portions of the surface of the composite body.

7. The composite body of claim 6 wherein the surface treatment process consists of coating the bodies.

8. A body formed of a plurality of segments, at least certain of which have a metallic base and means for retaining said segments in abutting relationship to one another to form said body, at least certain of said segments having undergone a hardening treatment applied to at least a portion of its later abutting surface previous to the assembly of said body.

9. The body of claim 8 wherein said treatment consists of applying a metallic-ceramic coating to said later abutting surface portions.

* * * * *

UNITED STATES PATENT OFFICE
CERTIFICATE OF CORRECTION

Patent No. 3,938,962          Dated February 17, 1976

Inventor(s) Weston H. Feilbach, Jr. and Charles S. Baum

It is certified that error appears in the above-identified patent and that said Letters Patent are hereby corrected as shown below:

Column 6, lines 10 and 16 change "adjourning" to --adjoining--.

Signed and Sealed this twenty-second Day of June 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,938,962  Dated February 17, 1976

Inventor(s) Weston H. Feilbach, Jr. and Charles S. Baum

It is certified that error appears in the above-identified patent and that said Letters Patent are hereby corrected as shown below:

Column 3, line 8 change "8" to --9--; line 11 change "9" to --8--; line 12 change "8" to --9--; line 13 change "8" to --9--.

Signed and Sealed this

Twenty-sixth Day of October 1976

[SEAL]

Attest:

RUTH C. MASON
Attesting Officer

C. MARSHALL DANN
Commissioner of Patents and Trademarks